(12) United States Patent
Miyama et al.

(10) Patent No.: US 9,337,706 B2
(45) Date of Patent: May 10, 2016

(54) MECHANICALLY AND ELECTRICALLY INTEGRATED MODULE

(75) Inventors: Yoshihiro Miyama, Tokyo (JP); Masao Morita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 284 days.

(21) Appl. No.: 14/240,619

(22) PCT Filed: Aug. 10, 2012

(86) PCT No.: PCT/JP2012/070462
§ 371 (c)(1),
(2), (4) Date: Feb. 24, 2014

(87) PCT Pub. No.: WO2013/042486
PCT Pub. Date: Mar. 28, 2013

(65) Prior Publication Data
US 2014/0232217 A1    Aug. 21, 2014

(30) Foreign Application Priority Data

Sep. 20, 2011  (JP) ................................. 2011-204619

(51) Int. Cl.
| H02K 11/00 | (2006.01) |
| H02K 9/22 | (2006.01) |
| H02K 5/20 | (2006.01) |
| H02M 7/00 | (2006.01) |

(52) U.S. Cl.
CPC .. *H02K 9/22* (2013.01); *H02K 5/20* (2013.01); *H02K 11/0073* (2013.01); *H02K 11/33* (2016.01); *H02M 7/003* (2013.01)

(58) Field of Classification Search
USPC ...................... 310/52–64, 68 D, 89, 407, 425
See application file for complete search history.

(56) References Cited

U.S. PATENT DOCUMENTS

| 9,035,517 | B2 * | 5/2015 | Rittmeyer | ........................ 310/91 |
| 2003/0222519 | A1 * | 12/2003 | Bostwick | ......................... 310/58 |
| 2004/0000820 | A1 * | 1/2004 | Cromas et al. | ................... 310/52 |

(Continued)

FOREIGN PATENT DOCUMENTS

| JP | 07-298552 | 11/1995 |
| JP | 08-047204 | 2/1996 |
| JP | 11-234955 | 8/1999 |
| JP | 2000-083351 | 3/2000 |
| JP | 2003-274605 | 9/2003 |

(Continued)

OTHER PUBLICATIONS

International Search Report issued Oct. 9, 2012, in PCT/JP12/070462 filed Aug. 10, 2012.

*Primary Examiner* — Naishadh Desai
(74) *Attorney, Agent, or Firm* — Oblon, McClelland, Maier & Neustadt, L.L.P.

(57) ABSTRACT

An inverter apparatus is incorporated integrally into a non-load-side of a motor such that an inverter cooler is interposed, and a non-load-side end frame of the motor includes: a flat base portion; a cylindrical non-load-side bearing portion that is disposed so as to protrude axially from near a center of a front surface of the base portion that faces a rotor, and that houses and holds a non-load-side bearing into which a non-load-side end portion of a rotating shaft of the rotor is mounted; and an annular first flange portion that is disposed so as to protrude axially from an outer circumferential edge portion of the front surface of the base portion so as to contact a non-load-side end surface of a cylindrical portion and a cylindrical member.

13 Claims, 6 Drawing Sheets

(56) References Cited

U.S. PATENT DOCUMENTS

2005/0168081 A1 8/2005 Takenaka et al.
2009/0121562 A1* 5/2009 Yim ............................... 310/54
2011/0304226 A1* 12/2011 Bradfield ....................... 310/52

FOREIGN PATENT DOCUMENTS

| JP | 2004-039749 | 2/2004 |
| JP | 2004/025808 | 3/2004 |
| JP | 2011/093200 | 8/2011 |

* cited by examiner

MECHANICALLY AND ELECTRICALLY INTEGRATED MODULE

TECHNICAL FIELD

The present invention relates to a mechanically and electrically integrated module in which an inverter apparatus is disposed at a non-load-side of a rotary electric machine in an axial direction, and particularly relates to a non-load-side end frame construction that rotatably supports a rotating shaft of the rotary electric machine.

BACKGROUND ART

Conventional inverter-integrated motors are configured such that a polyphase inverter module is disposed at a non-load-side of a motor portion in an axial direction (see Patent Literature 1, for example).

CITATION LIST

Patent Literature

Patent Literature 1: Japanese Patent Laid-Open No. 2004-39749 (Gazette)

SUMMARY OF THE INVENTION

Problem to be Solved by the Invention

In conventional inverter-integrated motors, because an end frame that supports a non-load-side of a rotating shaft of the motor portion is constituted by a flat plate on which a cylindrical bearing portion is disposed so as to protrude, end frame rigidity is reduced. Thus, one problem has been that loads from a rotor of the motor portion bear on the end frame, and the end frame may be warped, giving rise to shaft misalignment.

In order to suppress the occurrence of shaft misalignment, it is conceivable that rigidity could be increased by increasing the thickness of the end frame, but increasing the thickness of the end frame means increasing axial length of the motor portion. If the conventional inverter-integrated motor is mounted inside a limited space such as in an electric automobile, for example, when the axial length of the motor portion is increased, the cooling capacity of the inverter is reduced proportionately, giving rise to a new problem in that the inverter cannot be cooled sufficiently.

The present invention aims to solve the above problems and an object of the present invention is to provide a mechanically and electrically integrated module that can increase rigidity of a non-load-side end frame of a rotary electric machine without increasing a thickness of the non-load-side end frame to suppress occurrence of shaft misalignment by disposing an annular first flange portion that contacts a circumferential wall portion of a housing of a rotary electric machine so as to protrude from the non-load-side end frame in addition to a non-load-side bearing portion that rotatably supports a non-load-side end portion of a rotating shaft.

Means for Solving the Problem

In order to achieve the above object, according to one aspect of the present invention, there is provided a mechanically and electrically integrated module including: a rotary electric machine that includes: a housing that includes: a cylindrical circumferential wall portion; and a load-side end frame and a non-load-side end frame that are disposed on two axial ends of the circumferential wall portion; a stator that includes: an annular stator core; and a stator coil that is wound onto the stator core, the stator being held by the housing such that the stator core is housed in the circumferential wall portion in an internally fitted state; and a rotor that is rotatably supported by the load-side end frame and the non-load-side end frame so as to be disposed on an inner circumferential side of the stator; and an inverter apparatus that converts direct-current power into alternating-current power, the inverter apparatus being incorporated integrally into a non-load-side of the rotary electric machine such that an inverter cooler is interposed. The non-load-side end frame includes: a flat base portion; a cylindrical non-load-side bearing portion that is disposed so as to protrude axially from near a center of a front surface of the base portion that faces the rotor, and that houses and holds a non-load-side bearing into which a non-load-side end portion of a rotating shaft of the rotor is mounted; and an annular first flange portion that is disposed so as to protrude axially from an outer circumferential edge portion of the front surface of the base portion so as to contact a non-load-side end surface of the circumferential wall portion.

Effects of the Invention

According to the present invention, because a cylindrical non-load-side bearing portion is disposed so as to protrude axially from a center of a front surface of a base portion, and an annular flange portion is disposed so as to protrude axially from an outer circumferential edge portion of the front surface of the base portion, non-load-side end frame rigidity can be increased without increasing a thickness of the base portion. Thus, the occurrence of shaft misalignment can be suppressed without increasing an axial length of the mechanically and electrically integrated module.

DESCRIPTION OF EMBODIMENTS

Preferred embodiments of a mechanically and electrically integrated module according to the present invention will now be explained with reference to the drawings.

Embodiment 1

Figure 1:
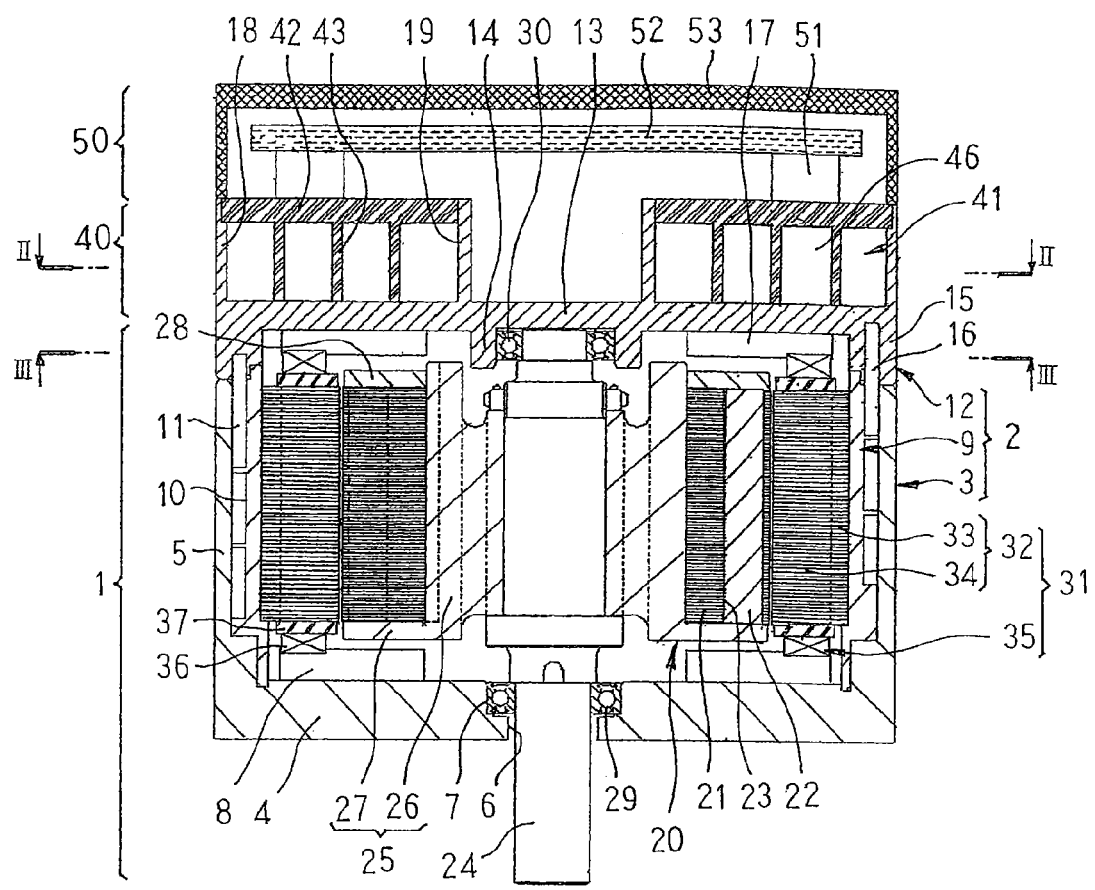
FIG. 1 is a cross section that shows a mechanically and electrically integrated module according to Embodiment 1 of the present invention.
Figure 2:
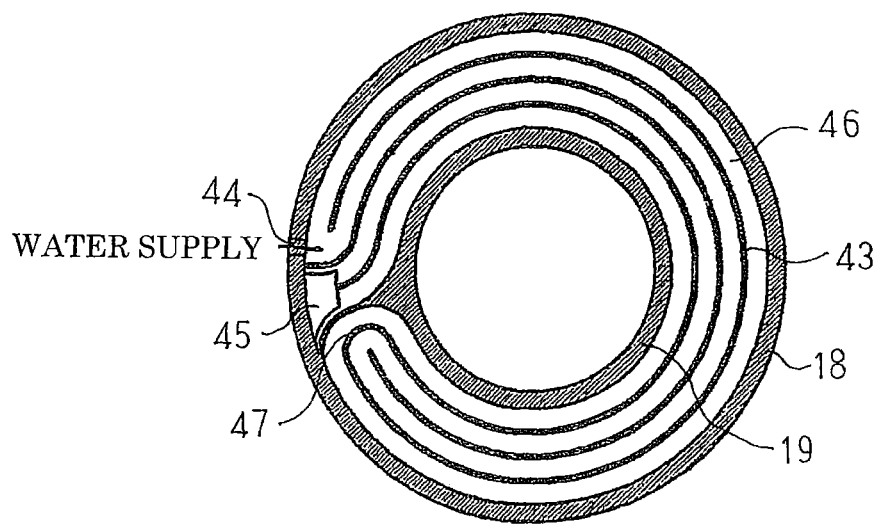
FIG. 2 is a cross section that is taken along Line II-II in FIG. 1 so as to be viewed in the direction of the arrows.
Figure 3:
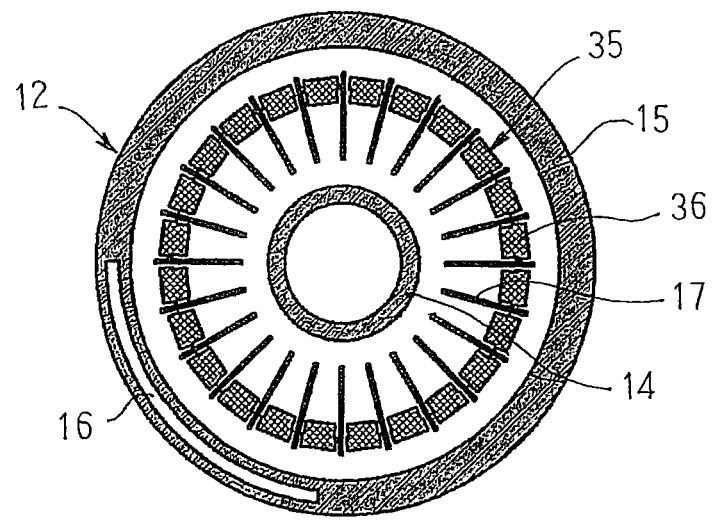
FIG. 3 is a cross section that is taken along Line III-III in FIG. 1 so as to be viewed in the direction of the arrows.

FIG. 1 is a cross section that shows a mechanically and electrically integrated module according to Embodiment 1 of the present invention, FIG. 2 is a cross section that is taken along Line II-II in FIG. 1 so as to be viewed in the direction of the arrows, and FIG. 3 is a cross section that is taken along Line III-III in FIG. 1 so as to be viewed in the direction of the arrows.

In FIGS. 1 through 3, a mechanically and electrically integrated module 100 includes: an inverter apparatus 50 that converts direct-current power that is supplied from an external portion into alternating-current power; and a motor 1 that functions as a rotary electric machine that is driven to rotate by being supplied the alternating-current power that is converted by the inverter apparatus 50, and is configured such that the inverter apparatus 50 is incorporated integrally into a non-load-side of the motor 1 so as to have an inverter cooler 40 interposed.

The motor 1 includes: a housing 2; a rotor 20 that is rotatably disposed inside the housing 2; and a stator 31 that is mounted onto the housing 2 so as to surround the rotor 20.

The housing 2 includes: a floored cylindrical frame 3 that is constituted by a disk-shaped bottom portion 4 and a cylindrical portion 5 that is disposed so as to extend axially from an outer circumferential edge portion of the bottom portion 4; a cylindrical member 9 that is fitted inside the cylindrical portion 5 so as to form a circumferential wall portion of the housing 2 together with the cylindrical portion 5; and an end plate 12 that is fastened onto the frame 3 so as to cover an opening of the frame 3. Here, the bottom portion 4 constitutes a load-side end frame, and the end plate 12 constitutes a non-load-side end frame. The frame 3, the cylindrical member 9, and the end plate 12 are manufactured by die casting using aluminum, for example, but the material is not limited to aluminum provided that it is a good heat-conducting metal, and the manufacturing method is also not limited to die casting.

A shaft insertion aperture 6 is formed on the bottom portion 4 of the frame 3 so as to pass through a central axial position, and a load-side bearing portion 7 is formed so as to have an annular shape by expanding an aperture diameter of the shaft insertion aperture 6 near the opening of the frame 3. In addition, a plurality of load-side ribs 8 are disposed at a predetermined pitch circumferentially on a surface of the bottom portion 4 near the opening of the frame 3 so as to each extend radially at a predetermined projecting height. A helical groove 10 is formed on an outer circumferential surface of the cylindrical member 9 helically from a first axial end toward a second axial end.

The end plate 12 includes: a flat base portion 13 that has an outside diameter that is equal to that of the cylindrical portion 5; a non-load-side bearing portion 14 that is disposed so as to protrude coaxially in a cylindrical shape centrally on a first surface of the base portion 13; a first flange portion 15 that is disposed so as to protrude from an outer circumferential edge portion of the first surface of the base portion 13 in a cylindrical shape; a plurality of non-load-side ribs 17 that are each disposed at a predetermined pitch circumferentially on the first surface of the base portion 13 between the non-load-side bearing portion 14 and the first flange portion 15 so as to extend radially at a predetermined projecting height; a second flange portion 18 that is disposed so as to protrude from an outer circumferential edge portion of a second surface of the base portion 13 in a cylindrical shape; and a third flange portion 19 that is disposed so as to protrude from the second surface of the base portion 13 coaxially in a cylindrical shape centrally, and that is positioned radially outside the non-load-side bearing portion 14.

The cylindrical member 9 is fitted together with the cylindrical portion 5 so as to be fitted inside such that a second axial end thereof is oriented toward the bottom portion 4, and the end plate 12 is fastened to the frame 3 by a screw, etc., so as to cover an opening of the cylindrical portion 5. The first flange portion 15 of the end plate 12 thereby contacts a non-load-side end surface of a circumferential wall portion that is constituted by the cylindrical portion 5 and the cylindrical member 9 to configure a helical motor refrigerant passage 11 that extends from near the opening of the frame 3 toward the bottom portion 4. A communicating groove 16 is formed on the first flange portion 15 so as to face a first axial end of the motor refrigerant passage 11 to constitute an inlet port of the motor refrigerant passage 11 together with a communicating aperture 45 that is described below. A drainage port (not shown) is also formed on the cylindrical portion 5 so as to communicate between a second axial end of the motor refrigerant passage 11 and an external portion. Here, the motor refrigerant passage 11 is sealed by contact between component members, but a sealing member such as an O ring, etc., may also be interposed between the component members. Moreover, the motor refrigerant passage 11 constitutes a rotary electric machine refrigerant passage.

The rotor 20 includes: a cylindrical rotor core 21 that is configured by laminating thin magnetic sheets such as electromagnetic steel sheets; twenty permanent magnets 22 that are respectively housed in and fixed to each of twenty magnet housing apertures 23 that are formed so as to pass axially through the rotor core 21, and that are disposed at a uniform angular pitch circumferentially; a rotating shaft 24; and a spider 25 and a clamper 28 that fix the rotor core 21 to the rotating shaft 24. The permanent magnets 22 are disposed such that radially outer polarities thereof alternate circumferentially between North-seeking (N) poles and South-seeking (S) poles. The spider 25 is produced using a nonmagnetic material, and is constituted by: a cylindrical portion 26; and an annular flange portion 27 that extends radially outward from an entire circumference at a first axial end of the cylindrical portion 26. The clamper 28 is produced using a nonmagnetic material into a ring-shaped flat plate that can be fitted over the cylindrical portion 26 of the spider 25.

The rotor core 21 is attached to the spider 25 in a fixed state by being fitted over the cylindrical portion 26 from a side near the second axial end, and by being pressed onto the flange portion 27 by the clamper 28, which is fitted over the cylindrical portion 26 from the side near the second axial end. Then, the rotating shaft 24 is pressed into and fixed to a central axial position of the spider 25 to which the rotor core 21 is attached to assemble the rotor 20. Moreover, outside diameters of the flange portion 27 and the clamper 28 are less than or equal to an outside diameter of the rotor core 21, and greater than an innermost diameter of the permanent magnets 22 that are installed in the rotor core 21.

The rotor 20 is disposed rotatably inside the housing 2 such that a second axial end portion of the rotating shaft 24 is supported in the bottom portion 4 by means of a load-side bearing 29 that is housed in the load-side shaft bearing portion 7, and a first axial end of the rotating shaft 24 is supported in the end plate 12 by means of a non-load-side bearing 30 that is housed in the non-load-side bearing portion 14.

The stator 31 includes: a stator core 32 that has: an annular core back 33 that is configured by laminating thin magnetic sheets such as electromagnetic steel sheets; and twenty-four teeth 34 that each extend radially inward from an inner circumferential surface of the core back 33, and that are arranged at a uniform angular pitch circumferentially; and a stator coil 35 that is constituted by twenty-four concentrated winding coils 36 that are produced by winding conductor wires that are coated with an insulator into concentrated windings on the respective teeth 34 so as to have insulators 37 interposed that are produced using an insulating material. Here, six phase coils are each configured by connecting six circumferentially adjacent concentrated winding coils 36 in parallel, and two three-phase alternating current windings are each configured by wye-connecting three phase coils, for example.

The stator 31 is held on the housing 2 on an outer circumferential side of the rotor core 21 so as to be coaxial to the rotating shaft 24 by fitting the stator core 32 into the cylindrical member 9. Here, as shown in FIG. 3, each of the load-side and non-load-side ribs 8 and 17 extends radially so as to pass between the circumferentially adjacent concentrated winding coils 36.

A motor 1 that is configured in this manner operates as a 20-pole, 24-slot inner-rotor three-phase motor.

The inverter cooler 40 includes: the end plate 12; a cooling frame 42 that is produced into a flat ring shaped, and in which a first surface functions as an inverter module mounting surface; and flow channel ribs 43 that are disposed in three layers in a radial direction on a second surface of the cooling frame 42 so as to each extend circumferentially at a predetermined projecting height. The cooling frame 42 is fastened to the end plate 12 by a screw, etc., such that an outer circumferential side and an inner circumferential side of the cooling frame 42 contact the second flange portion 18 and the third flange portion 19 of the end plate 12 that are described above to form an annular inverter cooling chamber 41. The second flange portion 18 and the third flange portion 19 constitute an outer circumferential wall and an inner circumferential wall, respectively, of the inverter cooling chamber 41. As shown in FIG. 2, end portions of the flow channel rib 43 in an innermost layer and the flow channel rib 43 in an outermost layers are linked by a return rib 47. Thus, the flow channel ribs 43 contact a second surface of the end plate 12 to constitute an inverter refrigerant passage 46 in which cooling water that functions as a refrigerant that has flowed into the inverter cooling chamber 41 through the inlet port 44 flows approximately 360 degrees circumferentially in two rows on an outer circumferential side and is then turned back, flows approximately 360 degrees in a reverse direction circumferentially in two rows on an inner circumferential side, and is discharged through the communicating aperture 45. The communicating aperture 45 has an opening onto the communicating groove 16 that is formed on the first flange portion 15 of the end plate 12, and communicates between the motor refrigerant passage 11 and the inverter refrigerant passage 46. Moreover, the communicating aperture 45 and the communicating groove 16 constitute a communicating passage that communicates between the motor refrigerant passage 11 and the inverter refrigerant passage 46.

Here, the inverter refrigerant passage 46 is sealed by contact between component members, but a sealing member such as an O ring, etc., may also be interposed between the component members. The cooling frame 42, on which the flow channel ribs 43 are molded integrally, is manufactured by die casting using aluminum, for example, but the material is not limited to aluminum provided that it is a good heat-conducting metal, and the manufacturing method is also not limited to die casting.

The inverter apparatus 50 includes: six inverter modules 51 that are disposed at a uniform pitch circumferentially on the inverter module mounting surface of the cooling frame 42; a driving circuit substrate 52 that controls driving of the inverter module 51; and a protective cover 53 that is disposed so as to cover the inverter module 51 and the driving circuit substrate 52, that is fastened to the cooling frame 42 by a screw, etc., and that protects the inverter module 51 and the driving circuit substrate 52. Moreover, the inverter modules 51 are 2-in-1 inverter modules, for example, and alternating-current output terminals thereof are connected to the respective concentrated winding coils 36 by means of connecting conductors (not shown). Semiconductor switching elements such as metal-oxide-semiconductor field-effect transistors (MOSFETs), insulated gate bipolar transistors (IGBTs), etc., can be used for upper arm-side switching elements and lower arm-side switching elements that constitute the 2-in-1 inverter modules. Silicon, silicon carbide, gallium nitride, etc., can be used as the semiconductor material that is used in the switching element.

In a mechanically and electrically integrated module 100 that is configured in this manner, direct-current power that is supplied from an external electric power supply is converted into alternating-current power by the inverter apparatus 50, and is supplied to the stator coil 35. Rotating magnetic fields are thereby generated in the stator 31. Torque is generated by interaction between these rotating magnetic fields of the stator 31 and the magnetic fields from the permanent magnets 22, driving the rotor 20 to rotate, and this torque is outputted by means of the rotating shaft 24.

Then, cooling water is supplied through the inlet port 44 to the inverter refrigerant passage 46, and flows through the inverter refrigerant passage 46. The cooling water that has flowed through the inverter refrigerant passage 46 passes through the communicating aperture 45 and the communicating groove 16, flows into the motor refrigerant passage 11, flows through the motor refrigerant passage 11, and is discharged externally from near the bottom portion 4 of the frame 3.

Heat generated in the switching elements of the inverter modules 51 is transferred to the cooling frame 42, and is radiated to the cooling water that flows through the inverter refrigerant passage 46, suppressing temperature increases in the inverter modules 51. Heat generated in the stator coil 35 is transferred to the cylindrical member 9 by means of the stator core 32, and is radiated to the cooling water that flows through the motor refrigerant passage 11, suppressing temperature increases in the stator 31. Heat inside the motor 1 is transferred from the load-side ribs 8 through the bottom portion 4 to the cylindrical portion 5, and is radiated to the cooling water that flows through the motor refrigerant passage 11, and is also transferred from the non-load-side ribs 17 to the base portion 13, and is radiated to the cooling water that flows through the inverter refrigerant passage 46, suppressing temperature increases inside the motor 1.

According to Embodiment 1, because the end plate 12 includes a first flange portion 15 that is disposed so as to protrude in an annular shape from a outer circumferential edge portion of a first surface of the base portion 13 in addition to the non-load-side bearing portion 14 that is disposed so as to protrude in a cylindrical shape centrally on the first surface of the base portion 13, rigidity of the end plate 12 can be increased without increasing the thickness of the base portion 13. Thus, the end plate 12 is less likely to be deformed by the load of the rotor 20, enabling the occurrence of shaft misalignment that results from deformation of the end plate 12 to be suppressed. Because it is not necessary to increase the thickness of the base portion 13, axial length of the motor 1 is not increased. Thus, even if the mechanically and electrically integrated module 100 is mounted into a limited space such as in an electric automobile, sufficient volume can be ensured in the inverter cooling chamber 41, enabling the inverter modules 51 to be cooled sufficiently.

The plurality of non-load-side ribs 17 are each disposed circumferentially on the first surface of the base portion 13 so as to extend radially at a predetermined projecting height. Thus, because a direction of extension of the non-load-side ribs 17 is perpendicular to a direction of extension of the annular first flange portion 15, rigidity in the direction of twisting of the end plate 12 is increased. Thus, the occurrence of deformation of the end plate 12 due to the load of the rotor 20 is further suppressed.

Because the non-load-side ribs 17 are disposed so as to extend radially so as to pass between the concentrated winding coils 36, a length of radial extension of the non-load-side ribs 17 can be increased without increasing the axial length of the motor 1, enabling the rigidity of the end plate 12 to be further increased.

Because the second flange portion 18 and the third flange portion 19 are disposed so as to project in annular shapes from the outer circumferential side and the inner circumferential side of the rear surface of the base portion 13, the rigidity of the end plate 12 can be further increased. Because the second flange portion 18 and the third flange portion 19 constitute an outer circumferential wall and an inner circumferential wall of the inverter cooling chamber 41, the volume of the inverter cooling chamber 41 is not reduced, enabling the rigidity of the end plate 12 to be increased without losing cooling performance in the inverter cooler 40. In addition, because the end plate 12 constitutes a portion of the inverter cooler 40, the axial length of the mechanically and electrically integrated module 100 is proportionately shorter.

Because a non-load-side end portion of the rotating shaft 24 does not project outward from the base portion 13 of the end plate 12, and the annular third flange portion 19 is formed on the rear surface of the base portion 13, capacitors that have increased occupied volume and sensors such as rotation angle sensors can be installed in a space on the inner circumferential side of the third flange portion 19, enabling the mechanically and electrically integrated module 100 to be reduced in size. Furthermore, because capacitors and sensors such as rotation angle sensors that are installed in the space on the inner circumferential side of the third flange portion 19 are separated from the cooling frame 42 onto which the inverter modules 51 are mounted, they are less susceptible to heat generated in the inverter modules 51.

The flow channel ribs 43 are disposed in three layers in the radial direction on the surface of the cooling frame 42 that faces the base portion 13 so as to each extend circumferentially at the predetermined projecting height, and constitute the inverter refrigerant passage 46 in which the cooling water that functions as the refrigerant that flows in through the inlet port 44 flows approximately 360 degrees circumferentially in two rows on the outer circumferential side of the inverter cooling chamber 41 and is then turned back, flows approximately 360 degrees in a reverse direction circumferentially in two rows on the inner circumferential side of the inverter cooling chamber 41, and is discharged through the communicating aperture 45. Thus, the temperature of the cooling water increases gradually from the inlet port 44 toward the communicating aperture 45, but because the cooling water is turned around and flows approximately 360 degrees circumferentially in a reverse direction through the inner circumferential refrigerant passage after flowing approximately 360 degrees circumferentially through the outer circumferential refrigerant passage, the temperature of the cooling water is made uniform in the circumferential direction. Thus, cooling irregularities in the six inverter modules 51 that are mounted onto an inverter mounting surface of the cooling frame 42 so as to line up circumferentially are suppressed.

Because the motor refrigerant passage 11 is formed so as to extend from the non-load-side to the load-side helically inside the circumferential wall portion, heat generated in the stator coil 35 can be radiated effectively, enabling temperature increases in the stator 31 to be suppressed. Because the motor refrigerant passage 11 and the inverter refrigerant passage 46 are communicated by means of the communicating aperture 45 and the communicating groove 16, there is only one water supply port and one drainage port, facilitating piping.

The rotor core 21 is mounted onto the rotating shaft 24 by means of a spider 25. Thus, axial length of the motor 1 can be shortened by notching the inner circumferential side of the non-load-side end portion of the cylindrical portion 26 of the spider 25, and housing a tip end portion of the non-load-side bearing portion 14 in that notched portion. In addition, the wall thickness of the non-load-side bearing portion 14 can be increased by increasing the inside diameter of the notched portion in question, enabling the rigidity of the end plate 12 to be increased. Because a plurality of load-side ribs 8 are each disposed circumferentially on a surface of a frame 3 near an opening of a bottom portion 4 so as to extend radially at a predetermined projecting height, rigidity of the bottom portion 4 is increased, suppressing the occurrence of shaft misalignment.

Moreover, in Embodiment 1 above, flange portions that constitute the outer circumferential wall and the inner circumferential wall of the inverter cooling chamber 41 are formed on the base portion 13 of the end plate 12, but flange portions that constitute the outer circumferential wall and the inner circumferential wall of the inverter cooling chamber 41 may also be formed on the cooling frame 42.

In Embodiment 1 above, the number of poles in the motor 1 is twenty, and the number of slots is twenty-four, but the number of poles and the number of slots are not limited thereto.

In Embodiment 1 above, the number of inverter modules 51 is six, but the number of inverter modules 51 is not limited thereto.

In Embodiment 1 above, the configuration is such that cooling water is supplied to the inverter cooler 40, flows through the inverter refrigerant passage 46 to cool the inverter apparatus 50, and then flows through the motor refrigerant passage 11 to cool the motor 1, before being discharged, but the configuration may also be such that the semiconductors that are used in the inverter apparatus 50 are highly heat-resistant elements made of silicon carbide, for example, and the refrigerant is supplied to the motor refrigerant passage 11, flows through the motor refrigerant passage 11 to cool the motor 1, then flows through the inverter refrigerant passage 46 to cool the inverter apparatus 50, before being discharged.

In Embodiment 1 above, the plurality of load-side and non-load-side ribs 8 and 17 are disposed circumferentially on the bottom portion 4 and the base portion 13, but the rigidity of the bottom portion 4 and the base portion 13 can be increased if at least one of the load-side and non-load-side ribs 8 and 17 is disposed on the bottom portion 4 and the base portion 13.

Embodiment 2

Figure 4:
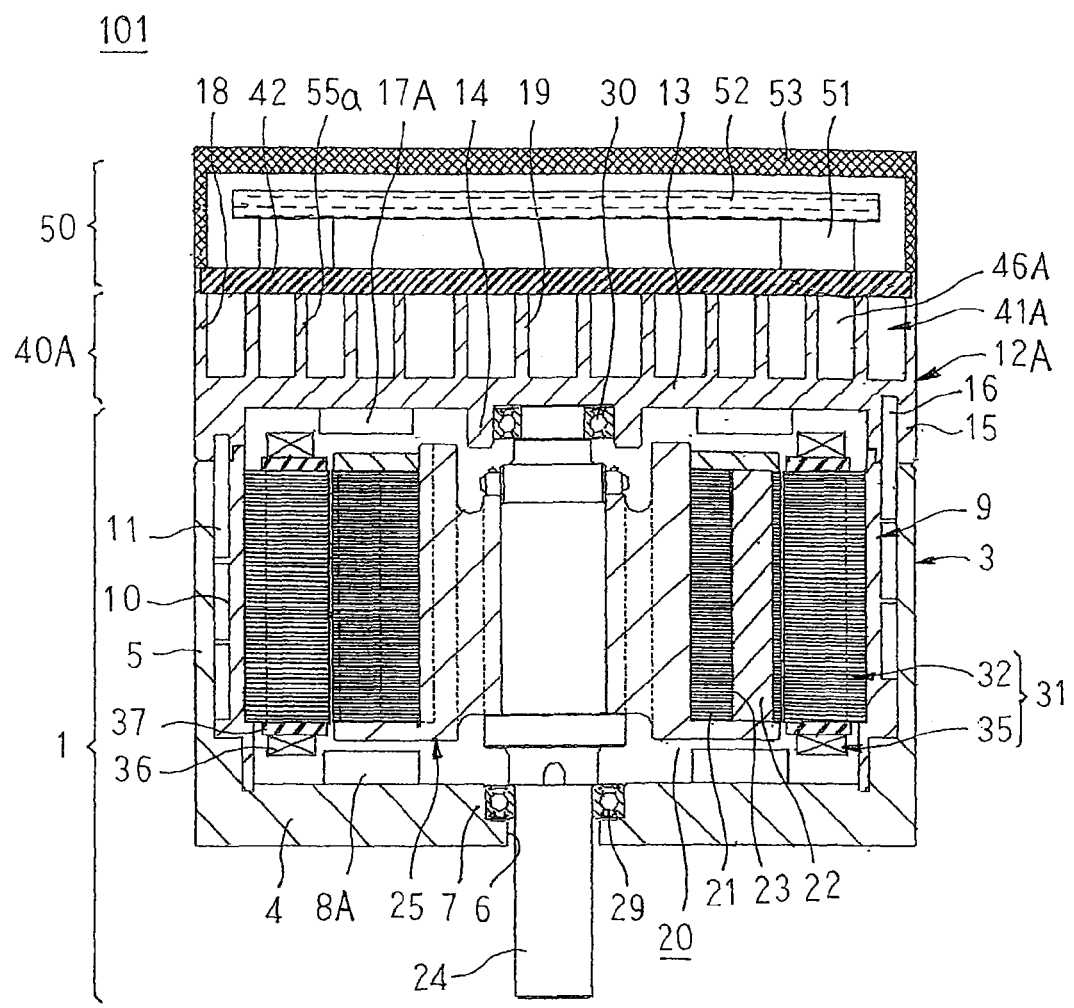
FIG. 4 is a cross section that shows a mechanically and electrically integrated module according to Embodiment 2 of the present invention.

FIG. 4 is a cross section that shows a mechanically and electrically integrated module according to Embodiment 2 of the present invention.

In FIG. 4, a plurality of load-side ribs 8A are each disposed at a predetermined pitch circumferentially on the surface of the bottom portion 4 near the opening between the non-load-side bearing portion 14 and the stator coil 35 so as to extend radially at a predetermined projecting height. A plurality of non-load-side ribs 17A are each disposed at a predetermined pitch circumferentially on the first surface of the base portion 13 between the non-load-side bearing portion 14 and the stator coil 35 so as to extend radially at a predetermined projecting height. A third flange portion 19 is disposed so as to protrude coaxially in a cylindrical shape centrally on a second surface of the base portion 13, and that is positioned radially inside the non-load-side bearing portion 14. Flow channel ribs 55a are disposed in five layers radially on the second surface of the base portion 13 between the second flange portion 18 and the third flange portion 19 so as to each extend circumferentially at a predetermined projecting height.

Moreover, the rest of the configuration is formed in a similar or identical manner to that of Embodiment 1 above.

In a mechanically and electrically integrated module 101 according to Embodiment 2, the cooling frame 42 is fastened to an end plate 12A by a screw, etc., such that an outer circumferential side and an inner circumferential side of the cooling frame 42 contact the third flange portion 19 and the second flange portion 18 of the end plate 12A to form an annular inverter cooling chamber 41A. Moreover, although not depicted, end portions of the flow channel ribs 55a that are disposed in five layers radially are linked by return ribs. Thus, the flow channel ribs 55a contact a second surface of the cooling frame 42 to constitute an inverter refrigerant passage 46A in which cooling water that has flowed into the inverter cooling chamber 41A through the inlet port 44 flows approximately 360 degrees in a forward direction circumferentially in two rows on an outer circumferential side, is then turned back and flows approximately 360 degrees in a reverse direction circumferentially in two rows on an inner circumferential side, is then turned back again and flows approximately 360 degrees in a forward direction circumferentially in two rows on an inner circumferential side, and is discharged through the communicating aperture 45. Consequently, in the inverter cooler 40A, the temperature of the cooling water is also made uniform in the circumferential direction, suppressing cooling irregularities in the six inverter modules 51 that are mounted onto an inverter mounting surface of the cooling frame 42 so as to line up circumferentially.

Because the third flange portion 19 that constitutes the inner circumferential wall of the inverter cooling chamber 41A is positioned radially inside the non-load-side bearing portion 14, heat generated in the non-load-side bearing 30 is radiated to the cooling water that flows through the inverter refrigerant passage 46A through the non-load-side bearing portion 14 and the base portion 13. Thus, the non-load-side bearing 30 is cooled effectively, enabling extension of service life to be achieved.

Because the flow channel ribs 55a that define the inverter refrigerant passage 46A are formed on the second surface of the base portion 13, rigidity of the end plate 12A can be increased. Thus, the thickness of the base portion 13 can be reduced, enabling axial length of the mechanically and electrically integrated module 101 to be shortened.

The load-side ribs 8A and the non-load-side ribs 17A are positioned on the inner circumferential side of the stator coil 35. Thus, because the load-side ribs 8A and the non-load-side ribs 17A can be disposed without being influenced by the stator coil 35, the number of load-side ribs 8A and non-load-side ribs 17A can be increased without increasing the axial length of the motor 1, enabling the rigidity of the bottom portion 4 and the end plate 12A to be increased. This configuration is particularly effective if the load-side ribs 8A and the non-load-side ribs 17A cannot be disposed radially across the stator coil, that is, if the stator coil is constituted by distributed windings, etc., or if there are a large number of crossover wires on the stator coil.

Embodiment 3

Figure 5:
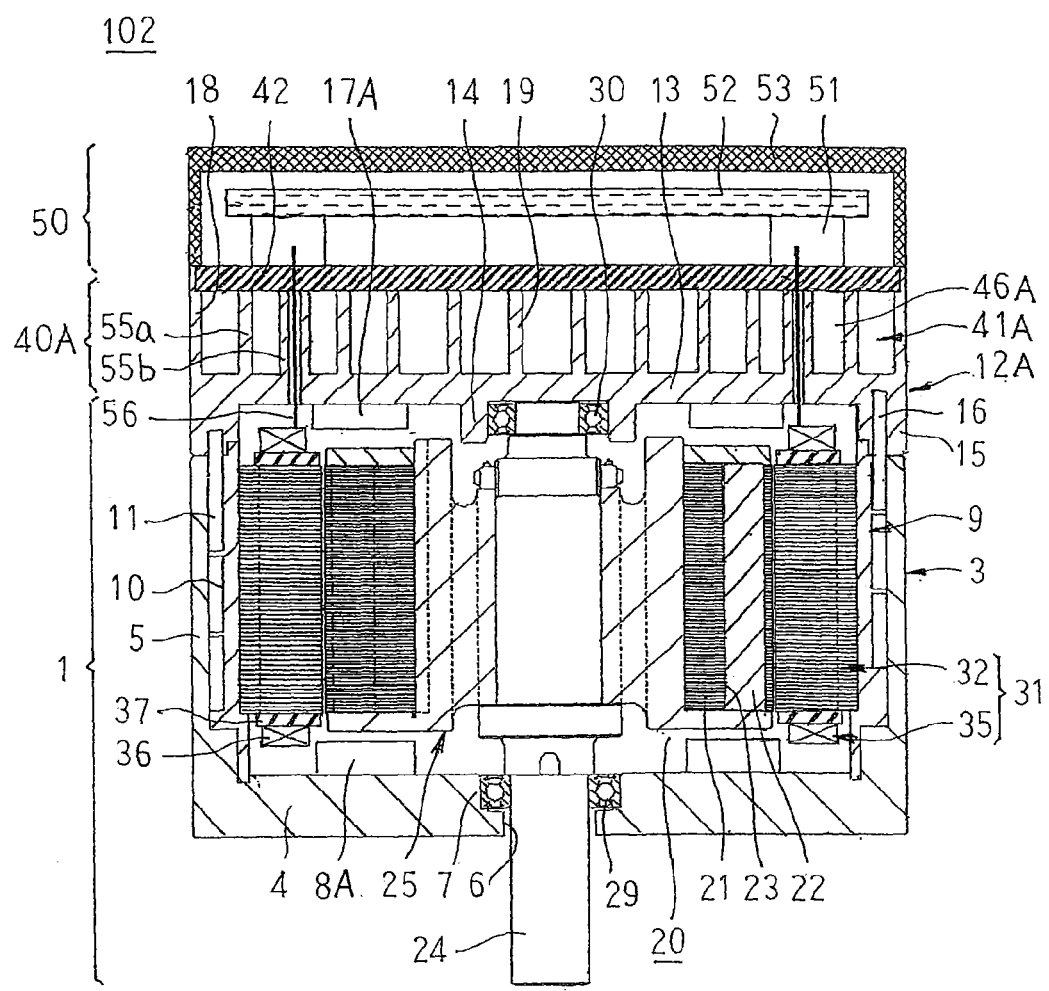
FIG. 5 is a cross section that shows a mechanically and electrically integrated module according to Embodiment 3 of the present invention.

FIG. 5 is a cross section that shows a mechanically and electrically integrated module according to Embodiment 3 of the present invention.

In FIG. 5, four flow channel ribs 55a and one flow channel rib 55b are disposed in five layers radially on the second surface of the base portion 13 between the second flange portion 18 and the third flange portion 19 so as to each extend circumferentially at a predetermined projecting height. The flow channel rib 55b is thicker than the flow channel ribs 55a. Connecting conductors 56 pass through the flow channel rib 55b such that electrical insulation is ensured to connect alternating-current output terminals of inverter modules 51 and concentrated winding coils 36.

Moreover, the rest of the configuration is formed in a similar or identical manner to that of Embodiment 2 above.

In a mechanically and electrically integrated module 102 according to Embodiment 3, because the cooling frame 42 can be fastened to the thick flow channel rib 55b by a screw, etc., mounting of the cooling frame 42 is facilitated, and strength of the inverter cooler 40A can be increased.

Because the connecting conductors 56 pass through the flow channel rib 55b to connect the alternating-current output terminals of the inverter modules 51 and the concentrated winding coils 36, connection between the alternating-current output terminals of the inverter modules 51 and the concentrated winding coils 36 is facilitated. In addition, heat generated in the concentrated winding coils 36 and the inverter modules 51 is radiated to the cooling water that flows through the inverter refrigerant passage 46A by means of the connecting conductors 56, effectively cooling the concentrated winding coils 36 and the inverter modules 51.

Embodiment 4

Figure 6:
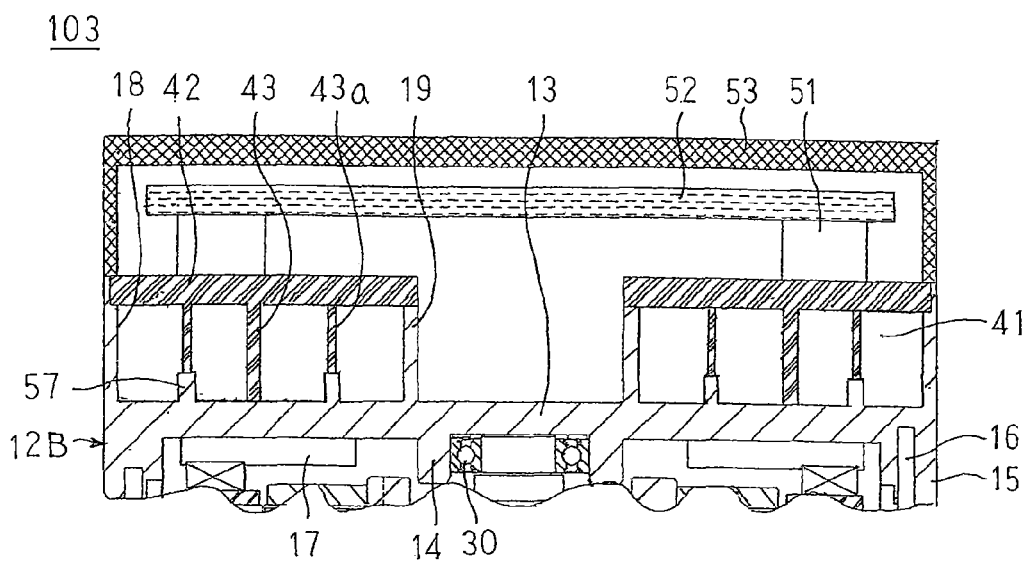
FIG. 6 is a partial cross section that shows a mechanically and electrically integrated module according to Embodiment 4 of the present invention.

FIG. 6 is a partial cross section that shows a mechanically and electrically integrated module according to Embodiment 4 of the present invention.

In FIG. 6, one flow channel rib 43 and two flow channel ribs 43a are disposed in three layers radially on the second surface of the cooling frame 42 so as to each extend circumferentially at a predetermined projecting height. The flow channel rib 43 has a projecting height that contacts the second surface of the base portion 13. The flow channel ribs 43a are disposed on two radial sides of the flow channel rib 43, and projecting heights thereof are shorter than that of the flow channel rib 43. Two reinforcing ribs 57 are formed on the second surface of the base portion 13 so as to extend circumferentially so as to respectively face the flow channel ribs 43a. The reinforcing ribs 57 have a projecting height that contacts the facing flow channel ribs 43a, and a thickness thereof is thicker than that of the flow channel ribs 43a.

Moreover, the rest of the configuration is formed in a similar or identical manner to that of Embodiment 1 above.

In a mechanically and electrically integrated module 103 according to Embodiment 4, the cooling frame 42 is fastened to an end plate 12B by a screw, etc., such that an outer circumferential side and an inner circumferential side of the cooling frame 42 contact the second flange portion 18 and the first flange portion 19 of the end plate 12B to form an annular inverter cooling chamber 41. The flow channel rib 43 contacts the second surface of the base portion 13, and the flow channel ribs 43a contact projecting end surfaces of the reinforcing ribs 57 to constitute an inverter refrigerant passage 46 inside the inverter cooling chamber 41.

Thus, because the reinforcing ribs 57 are formed on the second surface of the base portion 13 so as to extend circumferentially so as to respectively face the flow channel ribs 43a, rigidity of the end plate 12B can be increased without reducing the volume of the inverter cooling chamber 41.

Embodiment 5

Figure 7:
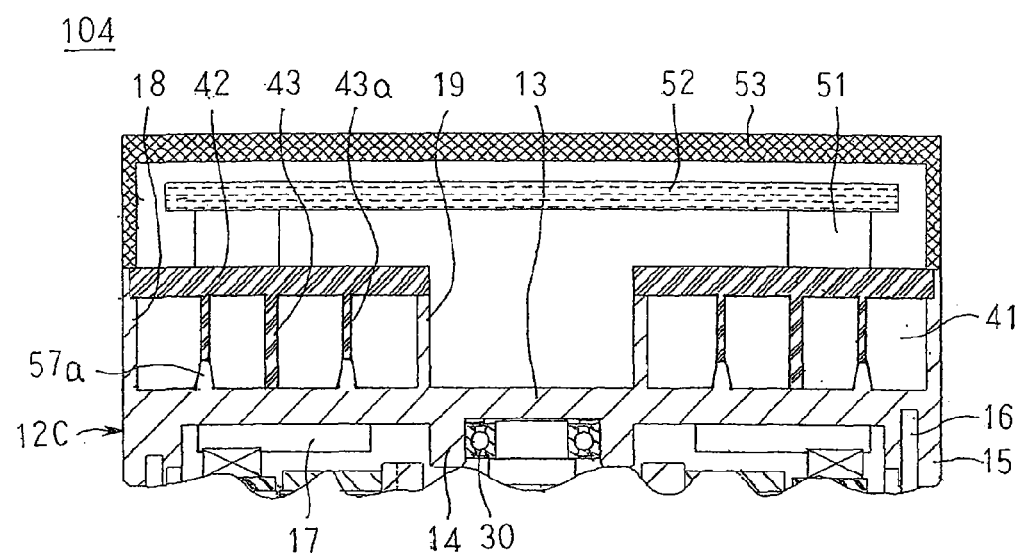
FIG. 7 is a partial cross section that shows a mechanically and electrically integrated module according to Embodiment 5 of the present invention.

FIG. 7 is a partial cross section that shows a mechanically and electrically integrated module according to Embodiment 5 of the present invention.

In FIG. 7, two reinforcing ribs 57a are formed on the second surface of the base portion 13 so as to extend circumferentially so as to respectively face flow channel ribs 43a. The reinforcing ribs 57a have a projecting height that contacts the facing flow channel ribs 43a. Furthermore, the reinforcing ribs 57a are formed so as to have a tapered shape that becomes gradually narrower from near a root toward a projecting end portion, and a thickness of that projecting end portion is equal to a thickness of the flow channel ribs 43a.

Moreover, the rest of the configuration is formed in a similar or identical manner to that of Embodiment 4 above.

In a mechanically and electrically integrated module 104 according to Embodiment 5, because the reinforcing ribs 57a are also formed on the second surface of the base portion 13 so as to extend circumferentially so as to respectively face the flow channel ribs 43a, rigidity of the end plate 12C can be increased without reducing the volume of the inverter cooling chamber 41.

Because the reinforcing ribs 57a are formed so as to have a tapered shape that becomes gradually narrower from near a root toward a projecting end portion, and a thickness of that projecting end portion is equal to a thickness of the flow channel ribs 43a, the flow channel ribs 43a connect to the reinforcing ribs 57a smoothly in a refrigerant passage cross section that is perpendicular to the direction of flow of the cooling water. Thus, generation of turbulence in the cooling water at the connecting portions between the flow channel ribs 43a and the reinforcing ribs 57a is suppressed, enabling reductions in cooling capacity that result from the formation of the reinforcing ribs 57a to be suppressed. Because the reinforcing ribs 57a are formed into a shape that tapers in the direction of projection, production of the end plate 12C by die casting is facilitated.

Embodiment 6

Figure 8:
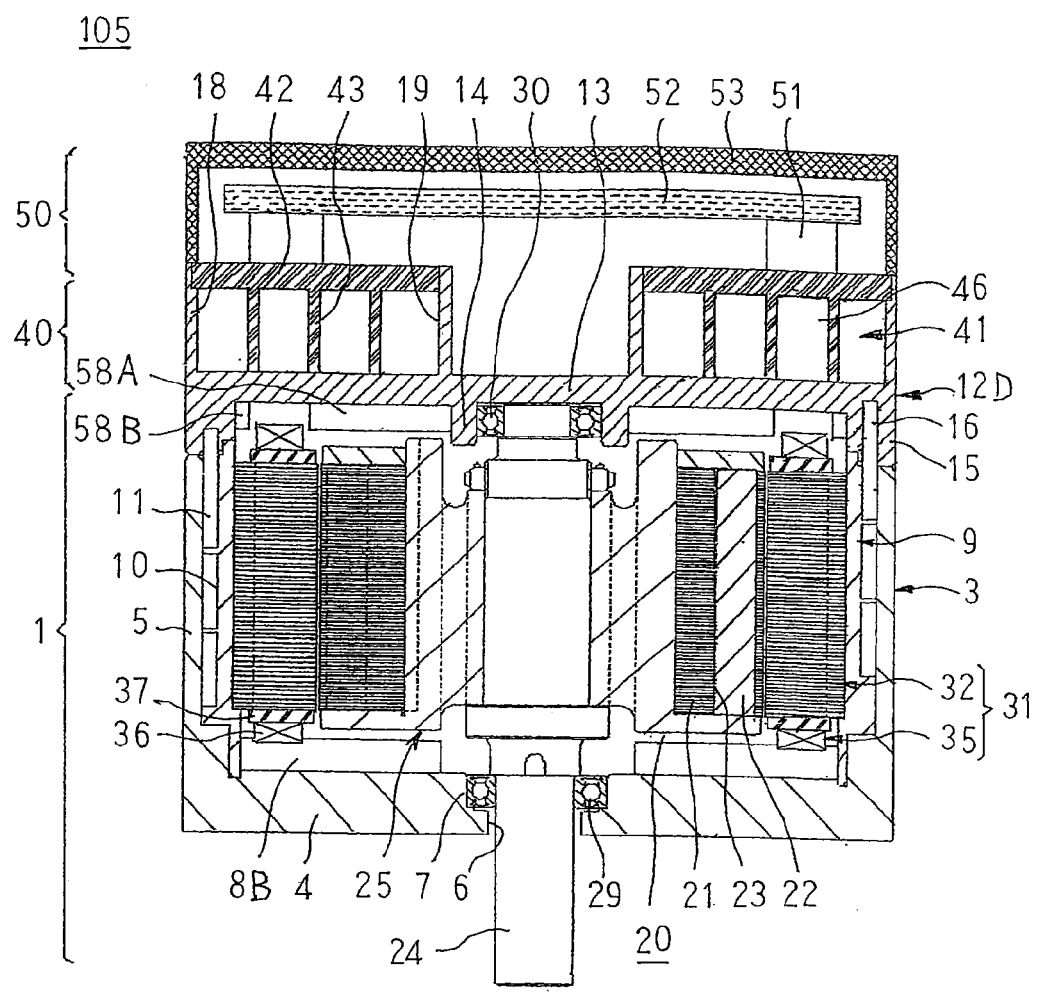
FIG. 8 is a cross section that shows a mechanically and electrically integrated module according to Embodiment 6 of the present invention.

FIG. 8 is a cross section that shows a mechanically and electrically integrated module according to Embodiment 6 of the present invention.

In FIG. 8, load-side ribs 8B are disposed at a predetermined pitch circumferentially on the surface of the bottom portion 4 near the opening of the frame 3 so as to each extend radially so as to pass between the concentrated winding coils 36 at a predetermined projecting height. In addition, the load-side ribs 8B contact the inner circumferential surface of the cylindrical portion 5. Moreover, although not depicted, notches into which the load-side ribs 8B are inserted are formed on the second axial end of the cylindrical member 9.

Non-load-side main ribs 58A that function as inner circumferential ribs are each disposed at a predetermined pitch circumferentially on the first surface of the base portion 13 between the non-load-side bearing portion 14 and the stator coil 35 so as to extend radially at a predetermined projecting height. The non-load-side main ribs 58A contact the outer circumferential surface of the non-load-side bearing portion 14. Non-load-side auxiliary ribs 58B that function as outer circumferential ribs are each disposed at a predetermined pitch circumferentially on the first surface of the base portion 13 between the stator coil 35 and the first flange portion 15 so as to extend radially at a predetermined projecting height. The non-load-side auxiliary ribs 58B are each positioned radially outside the non-load-side main ribs 58A, and contact the inner circumferential surface of the first flange portion 15.

Moreover, the rest of the configuration is formed in a similar or identical manner to that of Embodiment 1 above.

In a mechanically and electrically integrated module 105 according to Embodiment 6, because the load-side ribs 8B that are formed on the surface of the bottom portion 4 near the opening contact the inner circumferential surface of the cylindrical portion 5, rigidity of the bottom portion 4 can be increased.

Because the non-load-side main ribs 58A that are formed on the surface of the base portion 13 near the rotor 20 contact the outer circumferential surface of the non-load-side bearing portion 14, rigidity of an end plate 12D can be increased. In addition, because the non-load-side auxiliary ribs 58B contact the inner circumferential surface of the first flange portion 15, rigidity of the end plate 12D can be further increased. Thus, thickness of the base portion 13 can be reduced, enabling axial length of the mechanically and electrically integrated module 105 to be shortened.

Because heat generated in a non-load-side bearing 30 is transferred to the non-load-side main ribs 58A by means of the non-load-side bearing portion 14, and is radiated from the non-load-side main ribs 58A, the non-load-side bearing 30 is cooled effectively, enabling extension of service life of the non-load-side bearing 30 to be achieved.

Because the non-load-side main ribs 58A and the non-load-side auxiliary ribs 58B are disposed so as to be distributed onto a radially inner side and a radially outer side of the stator coil 35, spaces between the concentrated winding coils 36 at the non-load-side can be used to lead out crossover wires and the connecting wire portions of the stator coil 35 to the non-load-side.

Moreover, in Embodiment 6 above, the load-side ribs 8B are formed on the surface of the bottom portion 4 near the opening of the frame 3 so as to extend radially so as to pass between the concentrated winding coils 36, but the load-side ribs may also be formed on the surface of the bottom portion near the opening separately on the radially inner side and the radially outer side of the stator coil in a similar or identical manner to the ribs at the non-load-side.

In each of the above embodiments, cases in which a motor is used as a rotary electric machine have been explained, but an alternator or an alternating-current generator-motor may also be used as the rotary electric machine.

The invention claimed is:

1. A mechanically and electrically integrated module comprising:
    a rotary electric machine that comprises:
        a housing that comprises:
            a cylindrical circumferential wall portion; and
            a load-side end frame and a non-load-side end frame that are disposed on two axial ends of said circumferential wall portion;

a stator that comprises:
  an annular stator core; and
  a stator coil that is wound onto said stator core,
    said stator being held by said housing such that said stator core is housed in said circumferential wall portion in an internally fitted state; and
  a rotor that is rotatably supported by said load-side end frame and said non-load-side end frame so as to be disposed on an inner circumferential side of said stator; and
an inverter apparatus that converts direct-current power into alternating-current power, said inverter apparatus being incorporated integrally into a non-load-side of said rotary electric machine such that an inverter cooler is interposed,
wherein:
  said non-load-side end frame comprises:
    a flat base portion;
    a cylindrical non-load-side bearing portion that is disposed so as to protrude axially from near a center of a front surface of said base portion that faces said rotor, and that houses and holds a non-load-side bearing into which a non-load-side end portion of a rotating shaft of said rotor is mounted; and
    an annular first flange portion that is disposed so as to protrude axially from an outer circumferential edge portion of said front surface of said base portion so as to contact a non-load-side end surface of said circumferential wall portion; and
  at least one of said non-load-side bearing portion and said first flange portion is disposed such that an axial position thereof overlaps with said stator coil so as to be in a state of non-contact with said stator coil.

2. The mechanically and electrically integrated module according to claim 1, wherein said non-load-side end frame comprises one or more non-load-side ribs that are disposed circumferentially on said front surface of said base portion between said non-load-side bearing portion and said first flange portion such that each is disposed so as to extend radially at a predetermined projecting height.

3. The mechanically and electrically integrated module according to claim 2, wherein said non-load-side ribs are disposed such that an axial position thereof overlaps with said stator coil so as to be in a state of non-contact with said stator coil.

4. The mechanically and electrically integrated module according to claim 3, wherein:
  said stator coil is constituted by a plurality of concentrated winding coils that are wound onto respective teeth of said stator core; and
  each of said non-load-side ribs extends radially so as to pass between circumferentially adjacent concentrated winding coils.

5. The mechanically and electrically integrated module according to claim 3, wherein said non-load-side ribs are constituted by:
  inner circumferential ribs that are positioned between said non-load-side bearing portion and said stator coil; and
  outer circumferential ribs that are positioned between said stator coil and said first flange portion.

6. The mechanically and electrically integrated module according to claim 1, wherein said inverter cooler comprises:
  a cooling frame that is mounted onto said non-load-side end frame such that an inverter mounting surface faces axially outward, said cooling frame functioning together with said non-load-side end frame to form an inverter cooling chamber; and
  a plurality of flow channel ribs that are disposed radially so as to extend circumferentially to divide said inverter cooling chamber in a radial direction to form an inverter refrigerant passage inside said inverter cooling chamber.

7. The mechanically and electrically integrated module according to claim 6, wherein said non-load-side end frame comprises an annular second flange portion that is disposed so as to protrude axially from an outer circumferential edge portion of a rear surface of said base portion to constitute an outer circumferential wall of said inverter cooling chamber.

8. The mechanically and electrically integrated module according to claim 7, wherein said non-load-side end frame comprises an annular third flange portion that is disposed so as to protrude axially from an inner circumferential portion of said rear surface of said base portion to constitute an inner circumferential wall of said inverter cooling chamber.

9. The mechanically and electrically integrated module according to claim 7, wherein:
  said plurality of flow channel ribs are each formed on a surface of said cooling frame that faces said rear surface of said base portion;
  at least one flow channel rib of said plurality of flow channel ribs is formed so as to have a projecting height that is lower than a distance between said rear surface of said base portion and said surface of said cooling frame that faces said base portion;
  remaining flow channel ribs are formed so as to have a projecting height that contacts said rear surface of said base portion; and
  a reinforcing rib is disposed on said rear surface of said base portion so as to extend circumferentially so as to face said flow channel rib that has said lower projecting height to close a gap between said rear surface of said base portion and said flow channel rib that has said lower projecting height.

10. The mechanically and electrically integrated module according to claim 9, wherein said reinforcing rib is formed so as to be thicker than said flow channel rib that has said lower projecting height and faces said reinforcing rib.

11. The mechanically and electrically integrated module according to claim 9, wherein said reinforcing rib is formed so as to have a tapered shape in which a thickness thereof becomes gradually thinner toward said facing flow channel rib that has said lower projecting height, and a thickness of a projecting end portion thereof is equal to a thickness of said facing flow channel rib that has said lower projecting height.

12. The mechanically and electrically integrated module according to claim 7, said plurality of flow channel ribs are each formed on said rear surface of said base portion.

13. The mechanically and electrically integrated module according to claim 6, further comprising a rotary electric machine refrigerant passage that is formed in an internal portion of said circumferential wall portion,
  a communicating passage being formed on said base portion and said first flange portion so as to communicate between said inverter refrigerant passage and said rotary electric machine refrigerant passage.

* * * * *